May 3, 1955     LE ROY CLARDY     2,707,770
ELECTRICAL TESTING EQUIPMENT
Filed Feb. 3, 1951
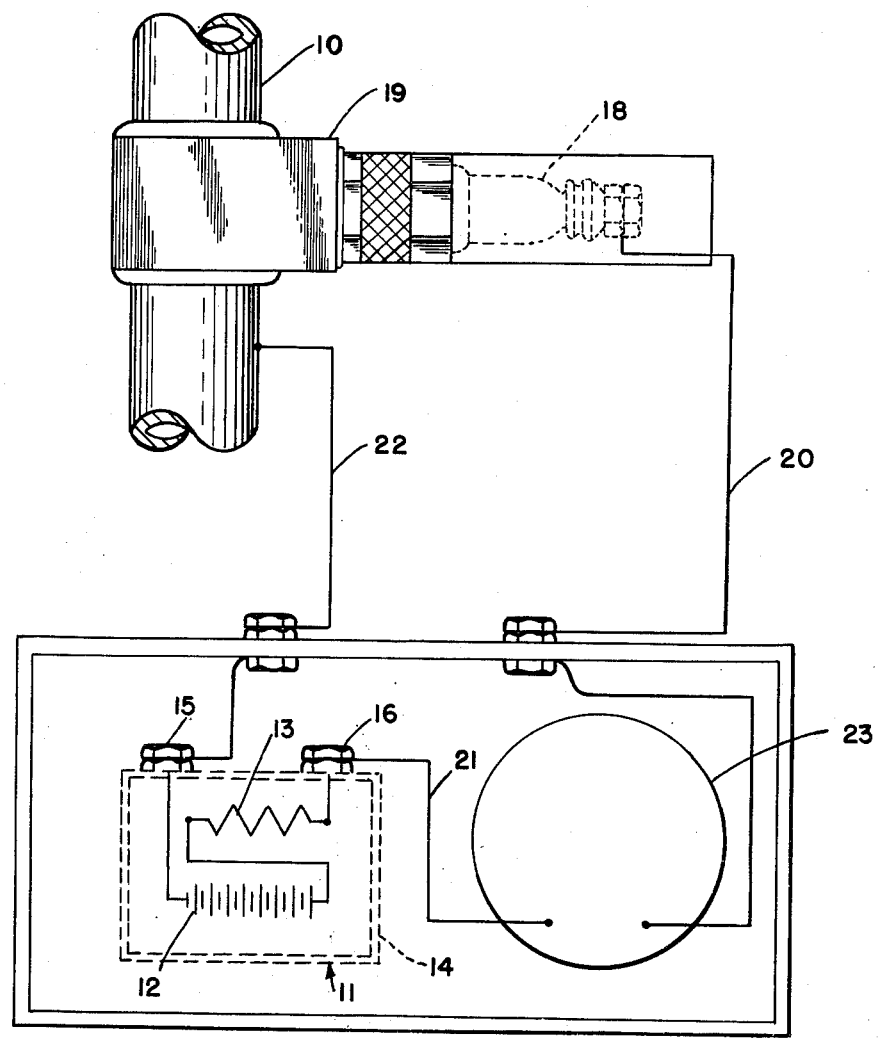
INVENTOR.
LE ROY CLARDY
BY
R. G. Story
ATTORNEY

United States Patent Office 2,707,770
Patented May 3, 1955

2,707,770

ELECTRICAL TESTING EQUIPMENT

Le Roy Clardy, Chicago, Ill., assignor to Swift & Company, Chicago, Ill., a corporation of Illinois Application February 3, 1951, Serial No. 209,260

2 Claims. (Cl. 324—65)

The present invention relates to a method and apparatus for making electrical tests in explosive atmospheres.

When using electrical apparatus in the vicinity of equipment using volatile materials, safety requirements necessitate that certain precautions be taken to prevent the possibility of an explosion of a mixture of that material and air, such precautions including the enclosure of all wiring and apparatus in grounded conduit and containers which are vapor tight. Similar precautions also are necessary in dust-laden atmospheres such as are found in and about grain elevators.

The installation of electrical measuring and indicating apparatus which meets these safety requirements is an expensive matter. Once the apparatus is installed, there is little or no flexibility for the making of changes occasioned by revised equipment or procedures, and constant supervision is required to insure that no defects, deterioration, or changes produce a hazardous condition by exposing the wiring to the explosive atmospheres that may exist from time to time.

Such safety requirements are not conducive to making the temporary tests that may be necessary or desirable upon occasion. Often it is easier and less expensive to shut down a plant to make these temporary tests than to go to the trouble and expense of installing temporary gas-tight apparatus, even though the shutdown may mean loss in production, etc. However, where the observations are to be made of an operating device, this is not feasible.

The principal object of the present invention is to provide a method of, and apparatus for, making electrical tests, whether they be of a permanent or temporary nature, under explosive conditions without incurring the risk of possible disastrous consequences. I have discovered that if the electrical energy in the circuit exposed to the explosive atmosphere is kept sufficiently low, it is impossible to produce a spark sufficiently strong to ignite even a highly inflammable vapor. It may be possible to produce a spark by portions of the circuit coming into physical contact and then separating, but the sparks obtained will not have sufficient energy to produce ignition.

By employing this invention, it is necessary only that the power source be such as to supply to the unenclosed portions of the circuit a sufficiently small amount of energy as to be incapable of producing a spark adequate to ignite the mixtures, and to prevent the accumulation of energy elsewhere in the circuit. I have devised a battery with an unusually high internal resistance whereby the current available at the battery terminals is exceptionally small compared to conventional practices. This small current at the rated voltage of the battery eliminates any necessity of special precautions being taken beyond the battery terminals.

Thus, in electrical testing equipment for possible use in explosive atmospheres, this invention permits the equipment to be installed without any special precautions being taken. No special enclosures or the like are required and the equipment may be portable or extremely flexible. Quantitative measurements may be made with such apparatus as well as mere indications of whether or not a given condition exists, as by means of a relay. The relay may be used to operate higher powered apparatus, in which case the relay and that apparatus are enclosed, placed outside the dangerous area, or a combination of both. In any one of the last mentioned cases, the ability to use the method and apparatus of the present invention for a substantial portion of the circuits will be of considerable advantage.

In other instances, it may be desired to make an electrical observation under conditions where if the test is to be made, it is absolutely necessary that the wires or electrodes be exposed to atmospheres which may become explosive. An example of this situation is in the propane chiller of a plant using propane as a solvent. Such plants and their operation are described in U. S. Patents Nos. 2,394,968, 2,383,535, and 2,367,671.

In those devices there is a tendency for water to collect in the propane chiller, which water must be drained off. In view of the inflammable nature of propane, the drain from the propane chiller must be enclosed to prevent the escape of any propane into the atmosphere. However, the enclosure does not permit the operator to ascertain when all the water has been eliminated and propane is being discarded.

Through the use of the present invention, the resistance of the liquid in the discharge pipe may be measured to determine whether or not the pipe contains water or propane. If by mischance, an explosive mixture should be produced by air being entrapped in the discharge pipe with some propane vapor, it would be impossible to produce a spark between the resistance-measuring electrodes sufficient to ignite that inflammable mixture to result in an explosion.

Additional objects and advantages will become apparent from the following description taken in conjunction with the drawing, in which the single figure is a diagrammatic illustration of an embodiment of the present invention.

The following description of a specific embodiment is for the purpose of complying with Section 4888 of the Revised Statutes and should not be construed as imposing any unnecessary limitations upon the appended claims. Many variations of the method and apparatus of this invention will become apparent to those skilled in the art from a reading of the following as well as the preceding part of this specification.

The single figure illustrates a device for ascertaining whether or not pipe 10 contains propane or water. As has previously been explained, it is desirable to discharge the accumulated water from the propane chiller, to which pipe 10 is connected, without unnecessary loss of propane therefrom. By measuring the resistance of the liquid in dran pipe 10, it is possible to ascertain whether or not the pipe contains propane or water because of the different electrical resistance of the two liquids.

The resistance-measuring device is powered by a novel battery, generally 11. The special battery 11 comprises a 22.5 volt battery 12 of the type commonly used in connection with hearing aids (for example, Burgess battery, type U15E), a resistance 13 having a nominal value of one megohm, a case 14 having a pair of terminals 15 and 16 thereon, and suitable wiring to connect the 22.5 volt battery 12 and resistance 13 in series between terminals 15 and 16. After the 22.5 volt battery 12 and resistance 13 have been placed in case 14 and connected to terminals 15 and 16, the assemblage is potted with a sealing compound to fix the position of the parts in the case and to insure that the electrical energy from the 22.5 volt battery 12 can only be discharged by way of terminals 15 and 16. To those skilled in the art, it will be apparent that the maximum current available from this battery is 22.5 microamperes and that the maximum power output is approximately 0.13 milliwatt.

To measure the resistance of the liquid in pipe 10, a pair of probes are necessary. These are obtained by using the body of pipe 10 for one of the probes and inserting a second probe into the pipe insulated from electrical contact with the body of pipe 10. In the illustrated embodiment, this second probe was formed from a conventional automobile spark plug 18, with the grounded (side) electrode of the spark plug removed. The pipe 10 is fitted with a special fitting 19 tapped to receive the threads of spark plug 18. Wires 20, 21, and 22 connect the pipe 10, the center electrode of plug 18, and battery 11 in series with a microammeter 23. The proper reading of the meter to indicate when pipe 10 contains propane or to indicate when it contains water may be calculated. However, the most simple method to calibrate the meter is to alternately fill the pipe with said liquids and to observe the reading of the meter.

The distributed capacity in wires 20, 21, and 22 should be kept small because if the capacity were large, it might store sufficient amounts of electrical energy to produce a strong spark at some point in the circuit if a short occurred at that point. Generally speaking, this capacity will not be large; however, should the wires be excessively long, it may be desirable to reduce the capacity by physically separating the wires.

While the above circuit may produce minute sparks when portions of this circuit become shorted, it has been found that it may be used in areas which may become contaminated by hazardous gases, liquids embraced by Group I, Class D classification of the National Electrical Code, or vapor from such liquids without igniting the highly flammable vapors therefrom. The liquids in this class include gasoline, petroleum, naphtha, alcohols, acetone, lacquer, solvent, and natural gas. As a matter of fact, tests indicate that the above circuit has a substantial factor of safety in that greater energy levels may be employed without producing ignition. The same tests indicate that no ignition can be obtained with a distributed capacity of less than 0.8 microfarad.

I claim:

1. An apparatus for obtaining electrical indications in an atmosphere which may be explosive, said apparatus including electrical sensing means, an electrical responsive device, supply means to furnish electrical energy at less than a predetermined voltage, and an electrical circuit connecting said sensing means, said device and said supply means in series, said supply means being sealed to exclude said atmosphere and having sufficient resistance therewithin to limit the current in said circuit at said voltage to an amount such that the amount of electrical energy in the exposed portion of said circuit always is less than that necessary to create a spark between any parts of said portion of sufficient intensity to ignite said atmosphere.

2. An apparatus for obtaining electrical indications in an atmosphere which may be explosive, said apparatus including electrical sensing means, an electrical responsive device, supply means to furnish electrical energy at less than a predetermined voltage, and an electrical circuit connecting said sensing means, said device and said supply means in series, said supply means being sealed to exclude said atmosphere and having sufficient resistance therewithin to limit the current in said circuit at said voltage to less than about 0.13 milliwatt whereby the amount of electrical energy in the exposed portion of said circuit always is less than that necessary to create a spark between any parts of said portion of sufficient intensity to ignite said atmosphere.

References Cited in the file of this patent

UNITED STATES PATENTS

| 1,924,606 | Hammona | Aug. 16, 1933 |
| 2,157,139 | Mirick | May 9, 1939 |
| 2,375,097 | Gage | May 1, 1945 |
| 2,432,390 | Darby | Dec. 9, 1947 |
| 2,492,459 | Bondurant | Dec. 27, 1949 |
| 2,540,425 | Byrum | Feb. 6, 1951 |
| 2,552,088 | Davis | May 8, 1951 |

OTHER REFERENCES

Ministry of Fuel and Power, Safety in Mines Research Board, Paper No. 104, Intrinsic Safety of Electrical Apparatus, The Minimum Igniting Current in Relation to Circuit Constants (1946), by G. Allsop, E. M. Guenault and A. D. I. Nicol Code No. 41–96–4.

Ministry of Fuel and Power Safety in Mines Research Board, Paper No. 106, Intrinsic Safety of Electrical Apparatus, The Minimum Igniting Current in Relation to Circuit Constants, Second Report (1947), S. O. Code No. 41–96–6.